(12) United States Patent
Massieu et al.

(10) Patent No.: US 6,375,076 B1
(45) Date of Patent: Apr. 23, 2002

(54) OPTOELECTRONIC DEVICE FOR ACQUISITION OF IMAGES, IN PARTICULAR OF BAR CODES

(75) Inventors: Jean-Louis Massieu, Montauban; Jean-Michel Puech, Toulouse, both of (FR)

(73) Assignee: Intermec IP Corp., Woodland Hills, CA (US)

(*) Notice: Subject to any disclaimer, the term of this patent is extended or adjusted under 35 U.S.C. 154(b) by 0 days.

(21) Appl. No.: 09/403,483
(22) PCT Filed: Apr. 21, 1998
(86) PCT No.: PCT/FR98/00803
 § 371 Date: Oct. 21, 1999
 § 102(e) Date: Oct. 21, 1999
(87) PCT Pub. No.: WO98/47377
 PCT Pub. Date: Oct. 29, 1998

(30) Foreign Application Priority Data

Apr. 21, 1997 (FR) .............................. 97 05103

(51) Int. Cl.[7] .............................. G06K 7/10; G06B 3/10
(52) U.S. Cl. .............................. 235/462.22; 235/462.23; 235/462.43
(58) Field of Search .............................. 235/454, 462.35, 235/462.43, 462.45, 462.23, 462.22

(56) References Cited

U.S. PATENT DOCUMENTS 3,853,403 A * 12/1974 Bentley .................. 356/71
4,794,238 A * 12/1988 Hampton ................ 235/462
5,164,584 A   11/1992 Wike, Jr. et al.
5,418,356 A    5/1995 Takano

FOREIGN PATENT DOCUMENTS

EP        0061000 A1   2/1982
EP        0514065 A2   11/1992
WO        WO 96/20454   7/1996

* cited by examiner

*Primary Examiner*—Michael G. Lee
*Assistant Examiner*—April Nowlin
(74) *Attorney, Agent, or Firm*—Seed IP Law Group PLLC

(57) ABSTRACT

An optoelectronic device for acquisition of images, such as images of bar codes, includes a case which contains an electronic scanning sensor, an illumination source and optics including a diaphragm that permit the formation of images on the sensor. The optics include at least two diopters disposed between the diaphragm and the sensor. For example, the diopters may take the form of a revolved symmetrical lens, the useful part of which is convex, and a cylindrical lens which does not create any deflection in a plane parallel to the optical plane, and is convergent in a plane perpendicular to the parallel plane.

19 Claims, 5 Drawing Sheets

OPTOELECTRONIC DEVICE FOR ACQUISITION OF IMAGES, IN PARTICULAR OF BAR CODES

The invention relates to an optoelectronic device for acquisition of images, in particular of bar codes.

The present optoelectronic devices which are designed for reading of bar codes conventionally comprise a case which contains an electronic scanning sensor, optical means which comprise a diaphragm, and make it possible to form images on the sensor, and to define an optical plane together with the latter, and electro-luminescent diodes which are designed to light the bar codes, and to permit acquisition of the images on the sensor. Finally, these devices comprise processing electronics which permit piloting of the sensor, and processing of the signals obtained from the latter.

In the conventional optoelectronic devices, the diaphragm has a circular aperture with a small diameter, such as to prevent defocussing of the image, and/or to increase the depth of field of the device. However, as a result of the small diameter of this aperture, the light intensity, which is reflected by the bar code and reaches the sensor, is reduced, and in practice this fact makes it necessary to use light sources which have high light intensity, such as to compensate for the reduction of light intensity.

It should be noted that it has been envisaged to increase the diameter of the aperture of the diaphragm, in order to increase the irradiance on the sensor. However, this solution leads to reduction of the depth of field of the device, and thus to reduction of the efficiency of the latter.

In order to eliminate these disadvantages, one solution consists of producing an optoelectronic device, as described in patent application EP 61000, the diaphragm of which has an aperture with a longitudinal axis which is at right-angles relative to the axis of the bar codes, such as an aperture which has a rectangular, rhomboid or elliptical shape.

In practice this solution makes it possible to increase the sensitivity of the optoelectronic devices, in proportion with the ratio of flow received relative to flow reflected. By this means, the depth of field of these devices is increased, without effecting substantially the intensity received on the sensor, and the efficiency of these devices is thus increased.

However, as a result of the relatively large dimensions of the aperture of the diaphragm, a solution of this type makes it necessary to use optical means for formation of the image on the sensor, which are larger than those of the conventional optical means, and which are thus more costly and complex to produce than those of the conventional optical means.

Another solution consists of producing optoelectronic devices as described in international patent application WO-9620454, comprising two dioptres at right-angles relative to one another, which are disposed between the diaphragm and the optical sensor, and are designed to obtain, in the optical plane (XOZ) parallel to the optical plane, enlargement m1 which is greater than the enlargement m2 in the plane (YOZ) perpendicular to the optical plane.

A solution of this type, which can also be associated with that which is described in patent EP-61000, has optical means with characteristics which lead to an increase, according to axes which are parallel to the bar codes, in the dimension of the lit surface of the said bar codes, the image of which is reflected on the sensor, and thus to an increase in the sensitivity of the optoelectronic device.

It should also be noted that since this increase in the sensitivity of the device is obtained simply from the design of the optical means, and not from the dimensions of the aperture of the diaphragm, a device of this type can be equipped with a conventional diaphragm with a circular aperture which has small dimensions, and thus with optical means with conventional dimensions, which are cheap and easy to produce.

However, as specified in the patent application in question on page 39, lines 23–24, with reference to FIG. 53, the optical means which make it possible to obtain this result are very problematic to produce, which has led the inventor to abandon this solution, and to propose a different solution.

The object of the present invention is to eliminate this disadvantage, and its main objective is to obtain enlargement m1 in planes (XOZ) parallel to the optical plane, which is greater than the enlargement m2 in a plane (YOZ) perpendicular to the said optical plane, by using optical means which are in common use and are easy to produce.

For this purpose, the invention relates to an optoelectronic device for acquisition of images, in particular of bar codes, comprising a case which is provided with a reading window, and contains an electronic scanning sensor, lighting means, and optical means which comprise a diaphragm, and are designed to ensure that images are formed on the sensor, and to obtain, in a plane (XOZ) parallel to the optical plane, enlargement m1 which is greater than the enlargement m2 in a plane (YOZ) perpendicular to the said optical plane, the sensor and the optical means defining an optical plane relative to which the reading window is centred, and the said sensor, reading window and optical means delimiting a useful optical reading field.

According to the invention, the optical means comprise:
first optical means, comprising a first, converging lens, consisting of a symmetrical lens which is revolved around the optical axis, the useful part of which is convex; and second optical means, comprising a so-called cylindrical lens with a semi-cylindrical dioptre, which is designed not to create any deflection in the plane (XOZ) parallel to the optical plane, and to converge in the plane (YOZ) perpendicular to the said optical plane.

According to the invention, the enlargement m1/m2 is obtained by means of lenses with a conventional design, i.e.:
a first symmetrical lens which is revolved by means of a simple conventional turn; and
a second, cylindrical conventional lens, of a design which is commonly available.

The invention thus leads to the same advantages as those described on page 39 of patent WO-9620454, whilst leading to conventional production of the optical means, the cost price of which does not make the cost of the optoelectronic device disadvantageous.

However, it has been found that although use of optical means which consist of a symmetrical lens which is revolved, and a cylindrical lens, lead to perfect results when the optoelectronic device is perfectly aligned with the bar code (product which is passed in front of a fixed optoelectronic device, etc), the astigmatism which optical means of this type introduce increases the sensitivity to errors of rotation around the optical axis.

For this reason, and according to another characteristic of the invention, the optical means additionally comprise a correction lens, which is associated with the first optical means. It should be noted that the construction of this correction lens is easy, since it is neutral in the plane XOZ in which the bar code is used.

In fact, the solution preferably consists of using a single- or multiple-component symmetrical lens which is revolved, which is associated with a cylindrical lens which has a meniscal-type profile for opposite enlargement, which is designed to cancel out the optical power in the plane (YOZ). This therefore retains the optical quality which is commonly achieved for symmetrical revolving optics necessary in the planes (XOZ). It should also be noted that the assembly of the main lens/correction lens must be optimised as a whole, since the cylindrical lens introduces an astigmatism at the edges of the fields.

Thus, the correction lens, which advantageously consists of a simple flat/concave cylindrical lens, constitutes a correction component which makes it possible to solve the problems of rotation, whilst maintaining the advantage of leading to an increase in the sensitivity of the device.

In practice, experiments have thus made it possible to show that the bar code can be inclined by an angle greater than 10°, before the MTF (Modulation Transfer Function) is reduced significantly.

According to another characteristic of the invention, the optical means are designed so that the ratio of m1/m2 is such that 3<m1/m2<5.

In fact, this ratio range constitutes a good compromise for the performance of the optoelectronic device, which leads to a substantial increase of the sensitivity of the latter relative to the present conventional devices, without however detracting from the functioning of the said device, if it is positioned in front of the object which is being rotated around the optical plane (XOZ).

According to another characteristic of the invention:
the ratio of the enlargement m1/m2 of the first and second optical means is such that m1/m2 is greater than 1; and
the first optical means are disposed in the vicinity of the diaphragm, between the said diaphragm and the second optical means.

In addition, the lens which is revolved is advantageously of the aspherical type, and has the shape of an ogive, such as to prevent geometric aberrations.

According to a further characteristic of the invention, the linear sensor and the diaphragm are disposed such that they are centred on axes at right angles relative to one another, a mirror which is inclined by an angle of 45° relative to the said axes being positioned such as to reflect the images on the said sensor.

This arrangement has the advantage that it leads to a reduction in the size of the optical means, and thus to optimisation of the size of the case.

According to a further characteristic of the invention, the diaphragm has an aperture with a dimension in the direction Y which is greater than that in the direction X. This leads to an increase in the sensitivity of the device or the depth of field.

Other characteristics, objects and advantages of the invention will become apparent from the following detailed description provided with reference to the attached drawings, which represent a non-limiting example of a preferred embodiment. In the drawings which are an integral part of the present invention:

Figure 1:
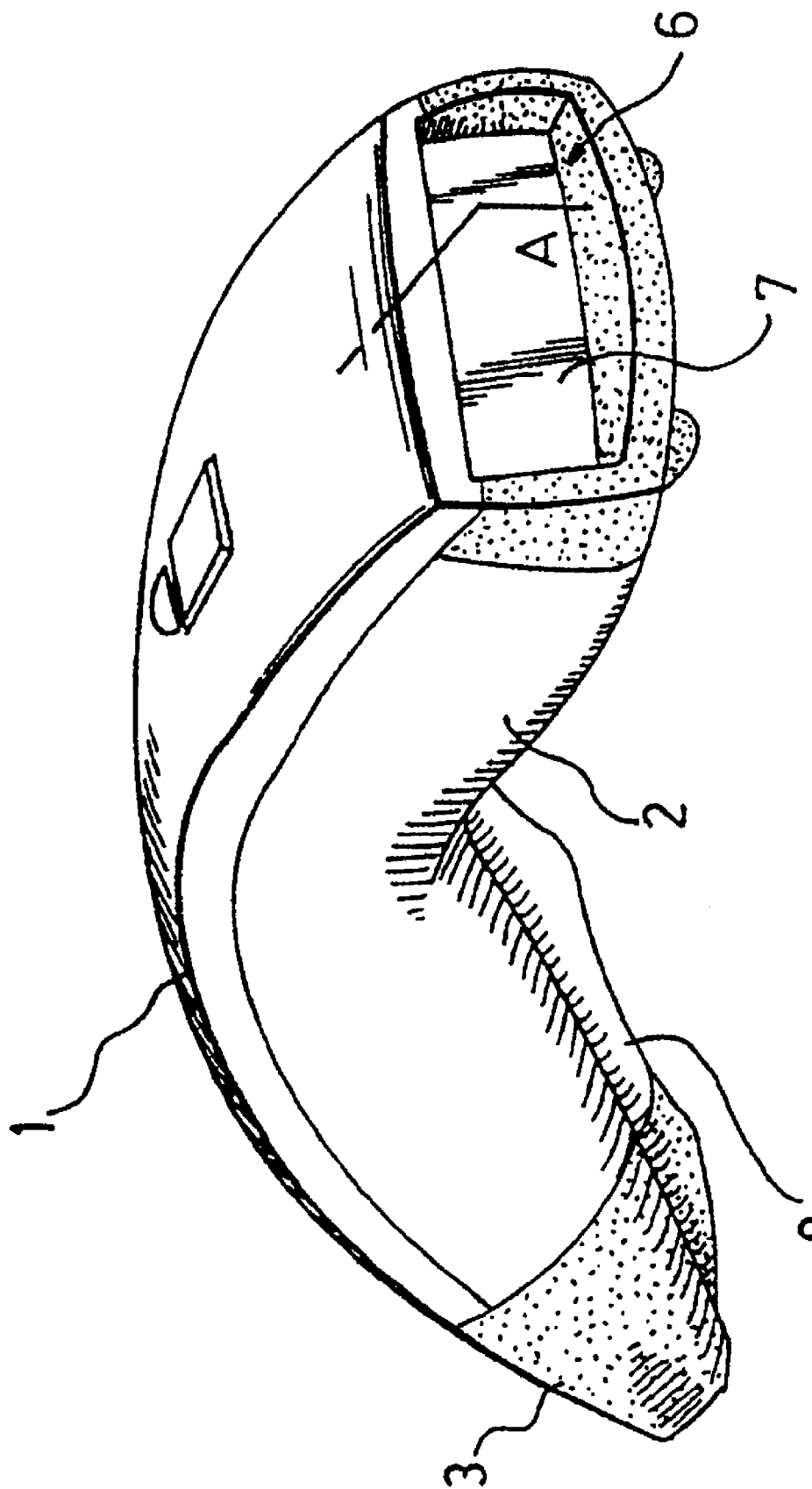
FIG. 1 is a perspective view of an optoelectronic device according to the invention.
Figure 2:
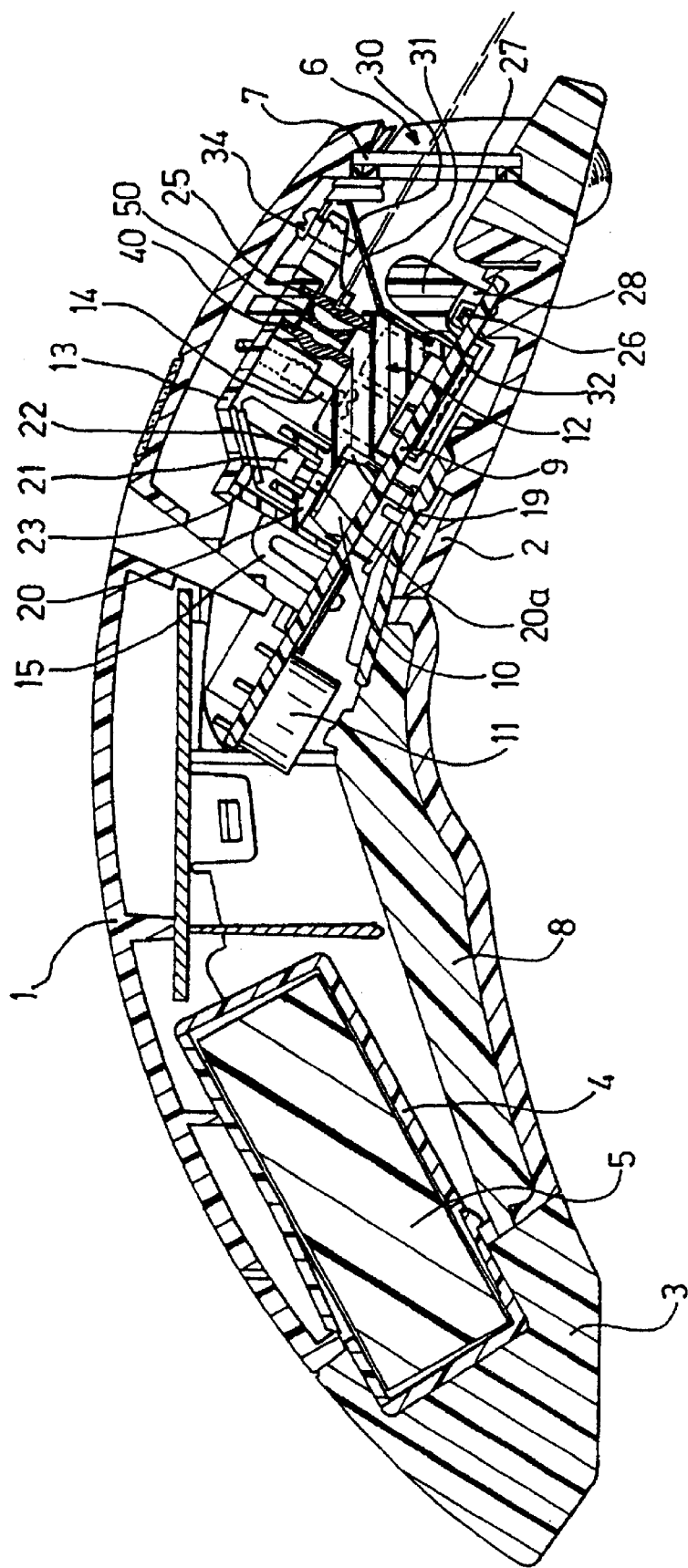
FIG. 2 is a longitudinal cross-section through an axial plane A.
Figure 3:
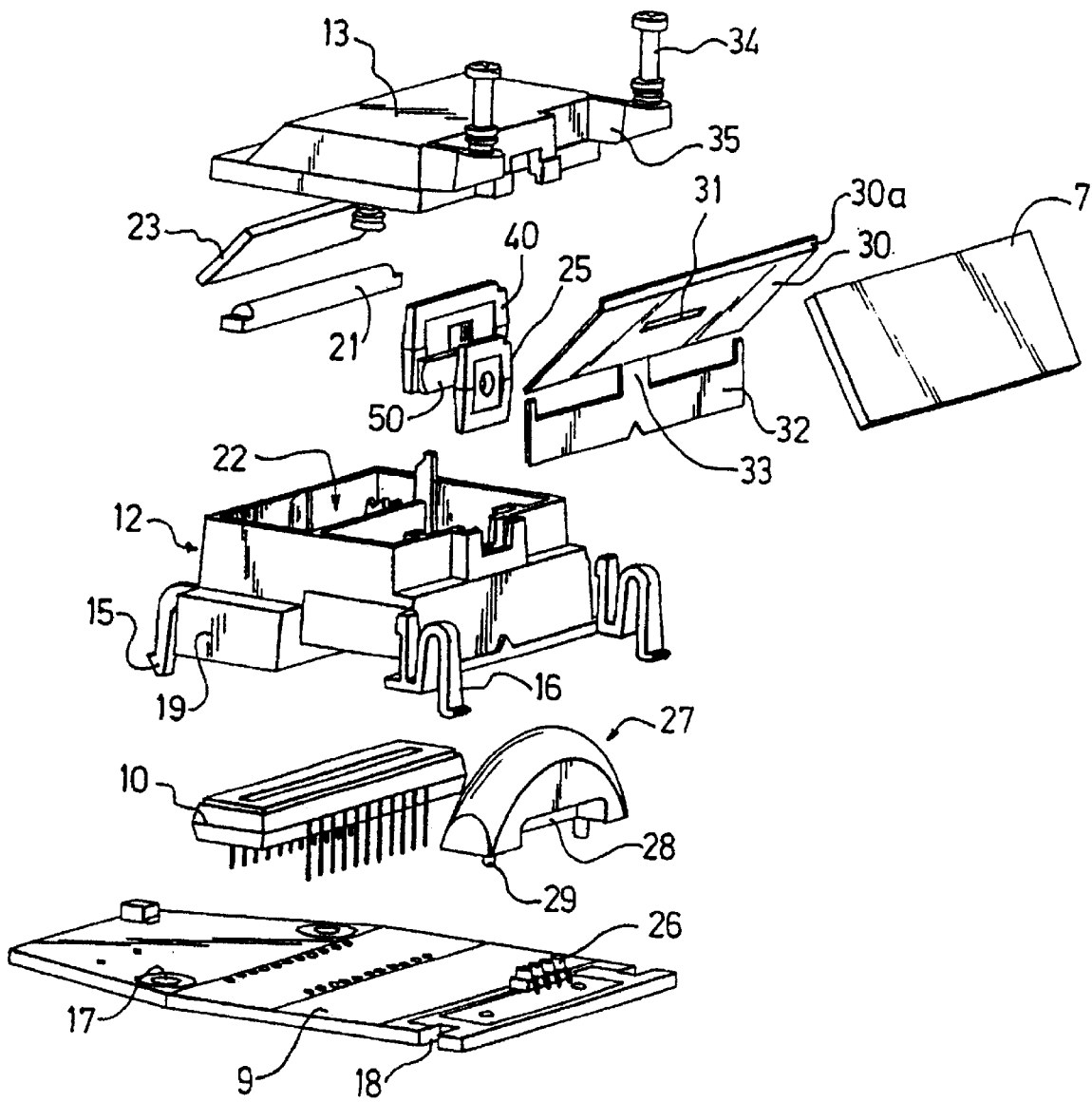
FIG. 3 is an exploded perspective view of the main components contained in the case of this optoelectronic device.
Figure 4:
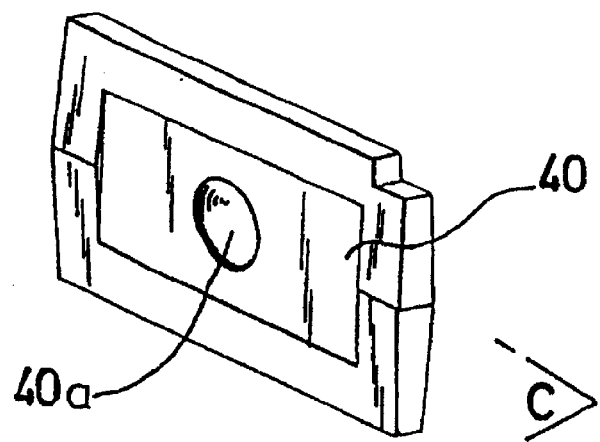
FIG. 4 is a perspective view of a lens which constitutes the first optical means of this device.

The optoelectronic device shown in FIGS. 1 and 2 consists of a bar code reader which is in the form of a case which is elbowed longitudinally, consisting of two shells 1, 2 which can be assembled by any known means, and a rear joining piece 3 which can be dismantled, and makes it possible to access a receptacle 4 for a battery 5.

At its front surface, the case additionally comprises an aperture 6, which is closed by a transparent window 7.

This case also comprises a longitudinal trigger 8, which extends through an aperture which is provided in the lower shell 2, and is articulated towards the rear end of the said shell.

Inside this case there is accommodated an electronic card 9, to which there are connected firstly a linear CCD sensor 10, and conventional electronic processing and decoding components which permit piloting of the said sensor, and processing of the signals obtained from the latter.

There is also connected to this electronic card 9 a switch 11, which is disposed such that it can be actuated by the trigger 8.

The optical means of this reader are disposed inside a case 12, closed by a cover 13, which is rendered integral with the said case by means of screws 14. This case 12 additionally comprises four locking lugs such as 15, 16, which project relative to its front and rear walls, and are disposed such that they snap into notches such as 17,18 provided in the electronic card 9.

On its under-surface, and juxtaposed with the front surface of its rear wall, the case 12 additionally comprises a receptacle 19 for the CCD sensor 10, which is separated from the interior of the said case by means of a flat wall 20, which contains a transverse slot 20a.

The optical means comprise firstly a lens 21 which is so-called cylindrical, i.e. which has a dioptre with a semi-cylindrical shape, and is disposed transversely in a receptacle 22 of the case 12, which is superimposed on the receptacle 19 for the CCD sensor 10. This lens 21 has a 6 mm focal length, and is disposed at a distance of approximately 2.5 mm from the CCD reader 10.

Figure 6A:
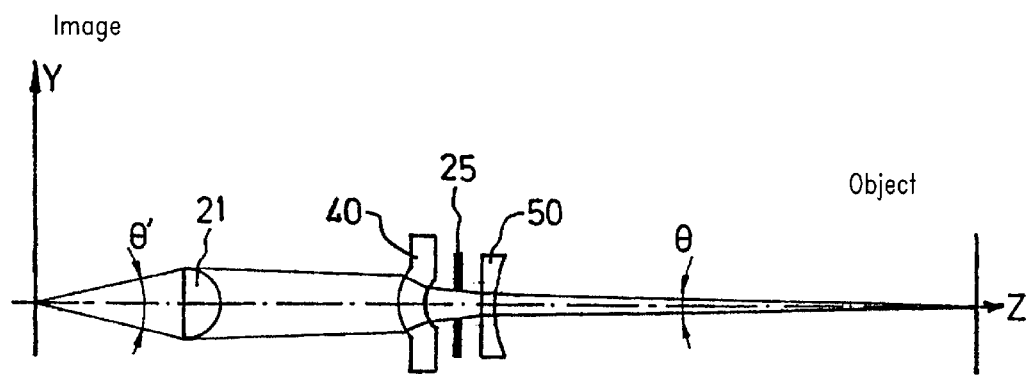
FIGS. 6a and 6b are skeleton diagrams which represent the path of the image beams according to two planes (YOZ) and (XOZ) which are at right-angles relative to one another.
Figure 6B:
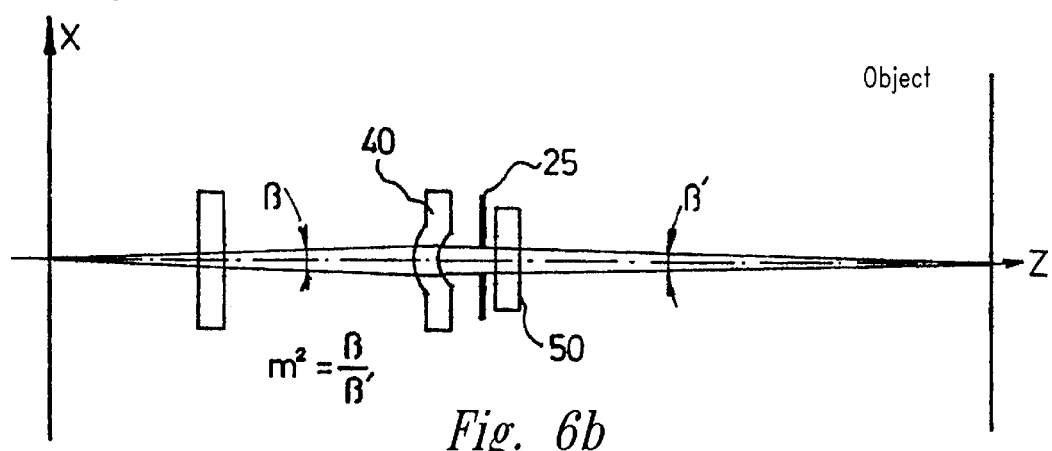
Figure 7:
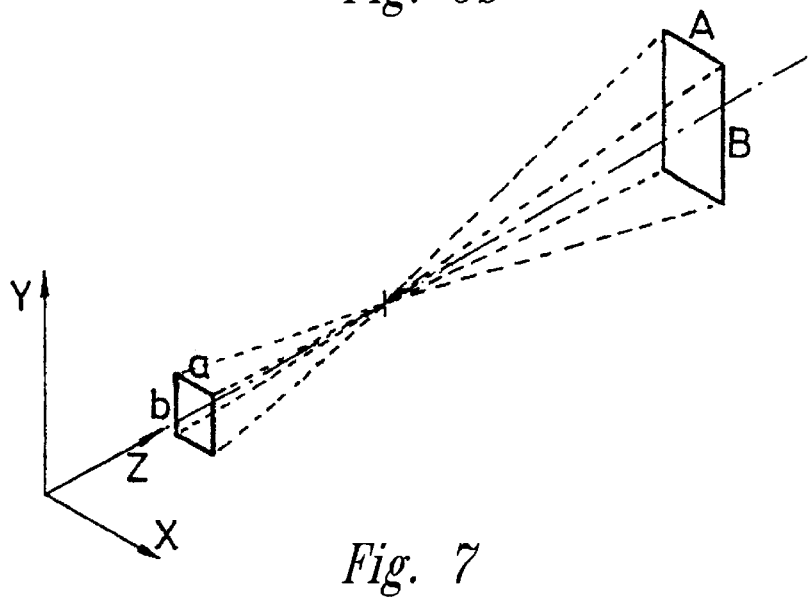
FIG. 7 represents the lit object surface, the image of which is reflected on the sensor, and the corresponding image of this surface on the said sensor.

As shown in FIGS. 6a and 6b, a lens of this type does not give rise to deflection of the light rays in a plane which is parallel to the optical plane, and is convergent in a plane which is perpendicular to the optical plane.

The optical means additionally comprise a mirror 23 which is inclined by 45° relative to the lens 21, and is rendered integral with the under-surface of a wall of the cover 13, which itself is inclined by 45°.

Figure 5:
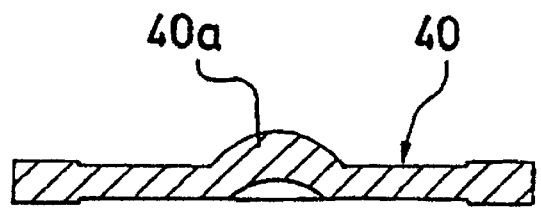
FIG. 5 is a longitudinal cross-section through a plane C of this lens.
Figure 8:
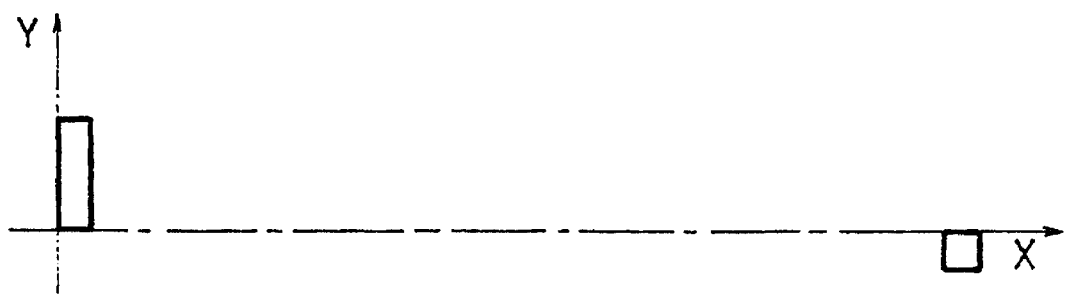
FIG. 8 is a schematic diagram showing the relative magnification in the X and Y directions.

As shown in FIGS. 5, 6a and 6b, the optical means also comprise a symmetrical lens 40 which is revolved, the useful part 40a of which can be semi-cylindrical or convex, and is fitted into slots which are provided opposite in the case 12 and cover 13.

These optical means also comprise a correction lens 50, consisting of a surface which has a radius of curvature of 7.5 mm.

Finally, these optical means comprise a diaphragm 25, which is provided with a circular entrance pupil with a diameter of 4.5 mm, which is disposed at a distance of 58 mm from the lens 21, and is fitted into grooves which are provided opposite in the case 12 and cover 13.

As shown in FIGS. 6a, 6b, 7, and 8 optical means of this type make it possible to "enlarge" according to the axis Y which is perpendicular to the optical plane, the dimension of the lit surface of the bar codes, the image of which is reflected on the sensor, and consequently make it possible to increase the sensitivity of the reader.

The means for lighting the reader are disposed directly downstream from the case 12. Firstly, they comprise four attached electro-luminescent diodes such as 26, which have an angle of diffusion of 125°. These four diodes 26 are connected to the electronic card 9, and are aligned according to an axis which is at right-angles relative to the optical axis.

These lighting means additionally comprise a convex lens 27 for focussing the light beam, in planes which are respectively parallel to, and perpendicular to the optical axis.

Firstly, this lens 27 comprises a flat dioptre, which is provided with a recess 28, which has a shape suitable for accommodating the diodes 26. In addition, this recess 28 is filled with a resin which has the same index of refraction as the lens 27.

This lens 27 additionally comprises two pins such as 29, which project relative to the flat dioptre of the lens, and allow the lens to be fitted onto the electronic card 9.

Finally, this lens 27 comprises a convex dioptre with a toroidal shape, which has two radii of curvature, respectively of 20 mm and 3.25 mm.

Finally, the lighting means comprise reflection means, which are disposed such as to intercept the light beams of the diodes 26, are inclined by an angle of 45°, and are designed such that the said light beams are centred on the optical axis.

These reflection means consist of a mirror 30, which is provided with a transverse slot 31 which allows the image beam to pass through, and in its upper part has a stiffening edge 30a. This mirror 30 is also connected to a support plate 32 by means of a tab 33, which acts as an axis of articulation between the said mirror and support plate.

This support plate 32 is designed to be accommodated in spaces provided between the front wall of the case 12 and the locking lugs 16, such that the slot 31 of the mirror 30 is centred on the optical axis, in which position the said slot is as close as possible to the diaphragm.

In addition, two screws, such as 34, each of which is disposed in a threaded bore provided in an arm such as 35, which projects relative to the front wall of the case 12, are designed to be supported on the mirror 30, such as to permit adjustment of the inclination of the latter, and/or to make it pivot relative to the support plate 32, in order to superimpose the light beam on the optical plane.

What is claimed is:

1. An optoelectronic device for acquisition of images, in particular of bar codes, comprising a case which is provided with a reading window, and contains an electronic scanning sensor, lighting means, and optical means which comprise a diaphragm, and are designed to ensure that images are formed on the sensor, and to obtain, in a plane parallel to the optical plane, enlargement m1 which is greater than the enlargement m2 in a plane perpendicular to the optical plane, the sensor and the optical means defining an optical plane relative to which the reading window is centered, and the said sensor, reading window and optical means delimiting a useful optical reading field, wherein the optical means comprise, disposed between the diaphragm and the sensor:

first optical means, comprising a first, converging lens, consisting of a symmetrical lens which is revolved around the optical axis, the useful part of which is convex; and second optical means, comprising a cylindrical lens with a semi-cylindrical diopter, which is designed not to create any deflection in the plane parallel to the optical plane, and to converge in the plane perpendicular to the said optical plane.

2. The optoelectronic device as claimed in claim 1 wherein the first optical means comprise a correction lens, which is associated with the cylindrical lens which is revolved.

3. The optoelectronic device as claimed in claim 1 wherein the optical means are designed so that the ratio of m1/m2 is such that $3 < m1/m2 < 5$.

4. The optoelectronic device as claimed in claim 1 wherein:

the ratio of the enlargements m1/m2 of the first and second optical means is such that m1/m2 is greater than 1; and the first optical means are disposed in the vicinity of the diaphragm, between the said diaphragm and the second optical means.

5. The optoelectronic device as claimed in claim 1 wherein the lens which is revolved is of the aspherical type, and has the shape of an ogive.

6. The optoelectronic device as claimed in claim 1 wherein the sensor and the diaphragm are disposed such that they are centered on axes at right angles relative to one another, a mirror which is inclined by an angle of 45° relative to the said axes being positioned such as to reflect the images on the said sensor.

7. The optoelectronic device as claimed in claim 1 wherein the diaphragm has an aperture in the direction (Y) which is greater than that in the direction (X).

8. An optics system for an optoelectronic imager, comprising:

a diaphragm;

a cylindrical lens positioned after the diaphragm along an optical path;

a converging lens positioned between the diaphragm and the cylindrical lens along the optical path, where the combination of the cylindrical lens and converging lens combine to produce an image having a first magnification in a first plane and a second magnification in a second plane, the second plane being substantially perpendicular to the first plane and the first magnification being greater than the second magnification; and a corrective lens positioned along the optical path.

9. The optics system of claim 8 comprising:

an optical sensor positioned after the cylindrical lens along the optical path, the optical sensor having an optical plane substantially parallel to the first plane.

10. The optics system of claim 8, further comprising:

a mirror positioned after the cylindrical along the optical path; and an optical sensor positioned after the mirror along the optical path, the optical sensor having an optical plane substantially parallel to the first plane.

11. An optoelectronic device for imaging, comprising:

a housing having a window formed therein;

an elongated optical sensor received in the housing, the optical sensor having a length and a width where the length is greater than the width;

a diaphragm received in the housing between the window and the sensor and the optical sensor; and an optical lens system received in the housing between the window and the optical sensor, the optical lens system having a first magnification factor along a first axis substantially parallel to the length of the optical sensor and a second magnification along a second axis substantially parallel to the width of the optical sensor, where the ratio of the first magnification to the second magnification is greater than 1.

12. The optoelectronic device of claim 11 wherein the ratio of the first magnification to the second magnification is greater than 3 and less than 5.

13. The optoelectronic device of claim 11 wherein the optical lens system comprises:
   a converging lens received in the housing between the diaphragm and the optical sensor; and
   a cylindrical lens received in the housing between the converging lens and the optical sensor.

14. The optoelectronic device of claim 11 wherein the optical lens system comprises:
   a converging lens received in the housing between the diaphragm and the optical sensor;
   a mirror received in the housing between the converging lens and the optical sensor; and
   a cylindrical lens received in the housing between the mirror and the optical sensor.

15. The optoelectronic device of claim 11, further comprising:
   a converging lens received in the housing between the diaphragm and the optical sensor;
   a mirror received in the housing between the converging lens and the optical sensor;
   a cylindrical lens received in the housing between the mirror and the optical sensor; and
   a correction lens received in the housing between the window and the diaphragm, the correction lens being shaped to cancel at least a portion of the magnification of the combination of the converging and cylindrical lenses along the second axis.

16. The optoelectronic device of claim 11, further comprising:
   a converging lens received in the housing between the diaphragm and the optical sensor;
   a mirror received in the housing between the converging lens and the optical sensor;
   a cylindrical lens received in the housing between the mirror and the optical sensor; and
   a flat/concave cylindrical correction lens received in the housing between the window and the diaphragm, the correction lens matched with the converging lens to be substantially neutral with respect to the magnification of the combination of the converging and the cylindrical lenses along the first axis and to cancel at least a portion of the magnification of the converging and the cylindrical lens combination along the second axis.

17. The optoelectronic device of claim 11, further comprising:
   a converging lens received in the housing between the diaphragm and the optical sensor;
   a mirror received in the housing between the converging lens and the optical sensor, wherein the converging lens is ogive shaped; and
   a cylindrical lens received in the housing between the mirror and the optical sensor.

18. An optoelectronic device for imaging, comprising:
   a housing having a window formed therein;
   an optical sensor received in the housing, the optical sensor having an optical plane for receiving light therealong; and
   an optical lens combination received in the housing between the window and the optical sensor, the optical lens combination having a first magnification in a first plane parallel to the optical plane and a second magnification in a second plane perpendicular to the optical plane, where a ratio of the first magnification and the second magnification is greater than 1.

19. The optoelectronic device of claim 18, further comprising:
   a diaphragm received in the housing along an optical path extending between the window and the optical sensor.

* * * * *

UNITED STATES PATENT AND TRADEMARK OFFICE
CERTIFICATE OF CORRECTION

| | | |
|---|---|---|
| PATENT NO. | : 6,375,076 B1 | Page 1 of 1 |
| DATED | : April 23, 2002 | |
| INVENTOR(S) | : Jean-Louis Massieu et al. | |

It is certified that error appears in the above-identified patent and that said Letters Patent is hereby corrected as shown below:

<u>Column 6,</u>
Line 53, "after the cylindrical along" should read -- after the cylindrical lens along --.

Signed and Sealed this

Tenth Day of December, 2002

JAMES E. ROGAN
*Director of the United States Patent and Trademark Office*